(12) United States Patent
Jang

(10) Patent No.: US 11,999,335 B2
(45) Date of Patent: Jun. 4, 2024

(54) DISC BRAKE APPARATUS USING GENERATOR-COMBINED MOTOR MEANS

(71) Applicants: Suk Ho Jang, Gwangmyeong-si (KR); JSH ECO ENERGY CO., LTD., Gwangmyeong-si (KR)

(72) Inventor: Suk Ho Jang, Gwangmyeong-si (KR)

(73) Assignees: Suk Ho Jang, Gwangmyeong-si (KR); JSH ECO ENERGY CO., LTD., Gwangmyeong-si (KR)

( * ) Notice: Subject to any disclaimer, the term of this patent is extended or adjusted under 35 U.S.C. 154(b) by 386 days.

(21) Appl. No.: 17/429,164

(22) PCT Filed: Jan. 15, 2020

(86) PCT No.: PCT/KR2020/000726
§ 371 (c)(1),
(2) Date: Aug. 6, 2021

(87) PCT Pub. No.: WO2020/166833
PCT Pub. Date: Aug. 20, 2020

(65) Prior Publication Data
US 2022/0089134 A1 Mar. 24, 2022

(30) Foreign Application Priority Data
Feb. 13, 2019 (KR) .................. 10-2019-0016742

(51) Int. Cl.
*B60T 8/32* (2006.01)
*F16D 55/226* (2006.01)
(Continued)

(52) U.S. Cl.
CPC .............. *B60T 8/32* (2013.01); *F16D 55/226* (2013.01); *F16D 2121/22* (2013.01); *F16D 2121/28* (2013.01)

(58) Field of Classification Search
CPC . B60T 8/32; B60T 13/748; B60T 1/10; B60T 13/586; B60T 2270/604;
(Continued)

(56) References Cited

U.S. PATENT DOCUMENTS 4,937,483 A      6/1990  Shuuichi et al.
5,333,706 A  *   8/1994  Mori ................. B60T 8/3255
                                                188/161

(Continued)

FOREIGN PATENT DOCUMENTS

JP     05-112227 A      5/1993
KR     20-0127519 Y1   10/1998
(Continued)

*Primary Examiner* — Pamela Rodriguez
(74) *Attorney, Agent, or Firm* — NKL LAW; Jae Youn Kim (57) ABSTRACT

The present invention relates to a disc brake, and more specifically, to a disc brake apparatus using a generator-combined motor, the disc brake apparatus comprising a fixed plate which has coil elements arranged radially and rotating plates which have magnet bodies arranged radially and corresponding to the coil elements, wherein: electric attraction between the fixed plate and the rotating plates enables primary braking and friction therebetween enables secondary braking, so as to minimize the occurrence of metal powder in a braking process, thereby preventing environmental pollution; and an electric reaction between the coil elements and the magnet bodies enables production of electricity, which can be used for power generation and to ensure electromotive power, thereby further improving use efficiency of the present invention.

3 Claims, 6 Drawing Sheets

(51) Int. Cl.
*F16D 121/22* (2012.01)
*F16D 121/28* (2012.01)

(58) Field of Classification Search
CPC .... F16D 2121/22; F16D 55/226; F16D 61/00; F16D 65/0031; F16D 2121/20; F16D 2121/28
See application file for complete search history.

(56) References Cited

U.S. PATENT DOCUMENTS

| | | |
|---|---|---|
| 2014/0158479 A1 | 6/2014 | Yui et al. |
| 2020/0300310 A1* | 9/2020 | Kostic ................... F16D 65/186 |
| 2021/0170878 A1* | 6/2021 | Straβer .................... B60L 7/26 |
| 2021/0323412 A1* | 10/2021 | Then-Gautier ........... B60L 7/24 |

FOREIGN PATENT DOCUMENTS

| | | |
|---|---|---|
| KR | 20-0132736 Y1 | 12/1998 |
| KR | 10-0280627 B1 | 2/2001 |
| KR | 10-0957635 B1 | 5/2010 |
| KR | 10-1045709 B1 | 6/2011 |
| KR | 10-2012-0051177 A | 5/2012 |

\* cited by examiner

DISC BRAKE APPARATUS USING GENERATOR-COMBINED MOTOR MEANS

TECHNICAL FIELD

The present invention relates to a disc brake, and more particularly to a disc brake apparatus including combined generation and electric operation means, which includes a stationary plate including coil elements fixed thereto, and a pair of rotating plates, which are rotatably disposed at two lateral sides of the stationary plate and each of which includes magnets, such that not only generation of electric power and electric operation but also braking of a drive shaft are realized.

BACKGROUND ART

These days, general land transportation vehicles include automobiles and motorcycles. Such automobiles and motorcycles are configured to generate power by driving an engine to thus rotate the wheels of the vehicles.

Such automobiles and motorcycles necessarily need a braking apparatus configured to perform braking function during traveling. The braking apparatus performs braking in such a way as to provide frictional force to lateral side surfaces of a disc using asbestos pads or to provide frictional force to a surface of a drum using a metal lining.

However, such a conventional braking apparatus generates fine metal particles caused by wear of the asbestos or the metal during frictional contact therebetween. These fine metal particles become the principal cause of environmental contamination, with the result that there is a severe problem whereby peoples suffer from respiratory disease due to environmental contamination.

Recently, the World Health Organization (WHO) has released a statement that the reason why nonsmokers have a high rate of incidence of lung cancer is environmental pollution. Actually, because pollution caused by fine heavy-metal particles that are generated from brakes and clutch pads of vehicles is a social problem that increases in severity with the number of automobiles, finding a solution for the problem is a very urgent matter.

In order to solve the above-mentioned problem, an electromagnetic brake apparatus has been suggested.

However, because most of the conventional electromagnetic brake apparatuses are configured to perform only an auxiliary braking function as in an ABS system or to be operated by electromagnets, there is a limit to braking force.

Furthermore, because the conventional electromagnetic brake apparatuses are dominantly configured to perform frictional braking, there is a problem whereby electric consumption increases.

RELATED ART DOCUMENTS

Patent Documents

[Patent Document 1]
Korea Utility Model Registration Publication No. 20-0127519
[Patent Document 2]
Korea Patent Registration Publication No. 10-1045709
[Patent Document 3]
Korea Patent Registration Publication No. 10-0280627
[Patent Document 4]
Korea Patent Registration Publication No. 10-0957635

DISCLOSURE

Technical Problem

Therefore, the present invention has been made in view of the above problems, and it is an object of the present invention to provide a disc brake apparatus including combined generation and electric operation means, which includes a stationary plate including coil elements, which are radially arranged thereat, and rotating plates including magnets, which are radially arranged so as to correspond to the coil elements, such that first electromagnetic braking is performed using attractive force between the stationary plate and the rotating plates and second mechanical braking is performed using frictional force therebetween, thereby minimizing the generation of fine metal particles and thus preventing environmental contamination caused by the fine metal particles.

Furthermore, it is another object of the present invention to provide a disc brake apparatus including combined generation and electric operation means, which is capable of generating electric power by virtue of electromagnetic interaction between coil elements and magnets and of performing electric operation in order to further improve efficiency in use.

Technical Solution

In accordance with the present invention, the above and other objects can be accomplished by the provision of a disc brake apparatus including combined generation and electric operation means including a disc unit including a stationary plate, which is made of a nonmagnetic material and includes a plurality of coil elements, which are radially arranged about a center of the stationary plate so as to be exposed from two lateral sides of the stationary plate, the stationary plate being fixed to a vehicle body and being disposed around a drive shaft so as to prevent rotational interference with the drive shaft, and a pair of rotating plates, which are made of a nonmagnetic material and are coupled to the drive shaft via a key so as to be rotated together with the drive shaft at two lateral sides of the stationary plate, the pair of rotating plates being provided on surfaces thereof that face the stationary plate with a plurality of magnets, which are radially arranged, and being elastically supported by respective compression springs, wherein electrical power is generated by charges applied to the coil elements and stored in a battery, a Hall sensor, which is disposed close to the rotating plates so as to detect voltage caused by magnetic fields generated from the magnets due to actuation of a brake pedal, the Hall sensor allowing current stored in the battery to be applied to the coil elements so as to electromagnetize the coil elements such that the polarity of the coil elements and the polarity of the magnets of the rotating plates interact with each other to provide braking force caused by attractive force between the rotating plates depending on the detected voltage, and a braking unit, which is disposed so as to surround peripheries of the rotating plates at two outer lateral sides of the rotating plates, the braking unit being configured to press the rotating plates to thus provide braking force caused by frictional force therebetween to the rotating plates when the brake pedal is actuated beyond an acceptable output range of the Hall sensor, wherein the Hall sensor is configured such that a distance between the Hall sensor and the magnets decreases, whereby the voltage detected by the Hall sensor increases with an increase in the pressing force of the brake pedal.

Advantageous Effects

As described above, the disc brake apparatus including combined generation and electric operation means according to the present invention is constructed to perform both electromagnetic braking using attractive force between a stationary plate and rotating plates and mechanical braking using frictional force therebetween. Consequently, it is possible to minimize the proportion of the entire braking procedure that is achieved through mechanical braking using frictional force and to realize stable braking. Furthermore, since the generation of fine metal particles caused by friction with asbestos or metal is minimized, there is an effect of preventing environmental contamination.

In addition, since the generation of electric power and electric operation are realized by virtue of electromagnetic interaction between coil elements and magnets, there are effects of being capable of realizing stable use of electric power and operating using a small amount of fuel and of further improving efficiency in use.

DESCRIPTION OF DRAWINGS

The above and other objects, features, and other advantages of the present invention will be more clearly understood from the following detailed description taken in conjunction with the accompanying drawings, in which.

(Description of Reference Numerals)

| | |
|---|---|
| 100: disc unit | 110: stationary plate |
| 111, 111': coil element | |
| 120, 120': rotating plate | |
| 121, 121': magnet | 130: compression spring |
| 200: Hall sensor | |
| 300: braking unit | 310, 310': press member |
| 320, 320': friction portion | |
| 330, 330': press portion | |
| 332: restoring spring | |
| 400: gyro sensor | |

BEST MODE

Unless otherwise defined, all terms including technical and scientific terms used herein have the same meanings as commonly understood by one of ordinary skill in the art to which this invention belongs. It will be further understood that terms, such as those defined in commonly used dictionaries, should be interpreted as having meanings consistent with their meaning in the context of the relevant art and the present disclosure, and are not to be interpreted in an idealized or overly formal sense unless expressly so defined herein.

Specific structural and functional descriptions of embodiments of the present invention disclosed herein are only for illustrative purposes of the preferred embodiments of the present invention, and the present description is not intended to represent all of the technical spirit of the present invention. On the contrary, the present invention is intended to cover not only the exemplary embodiments, but also various alternatives, modifications, equivalents and other embodiments that may be included within the spirit and scope of the present invention as defined by the appended claims.

Hereinafter, a preferred embodiment of the present invention will be described in detail with reference to the accompanying drawings.

Figure 1:
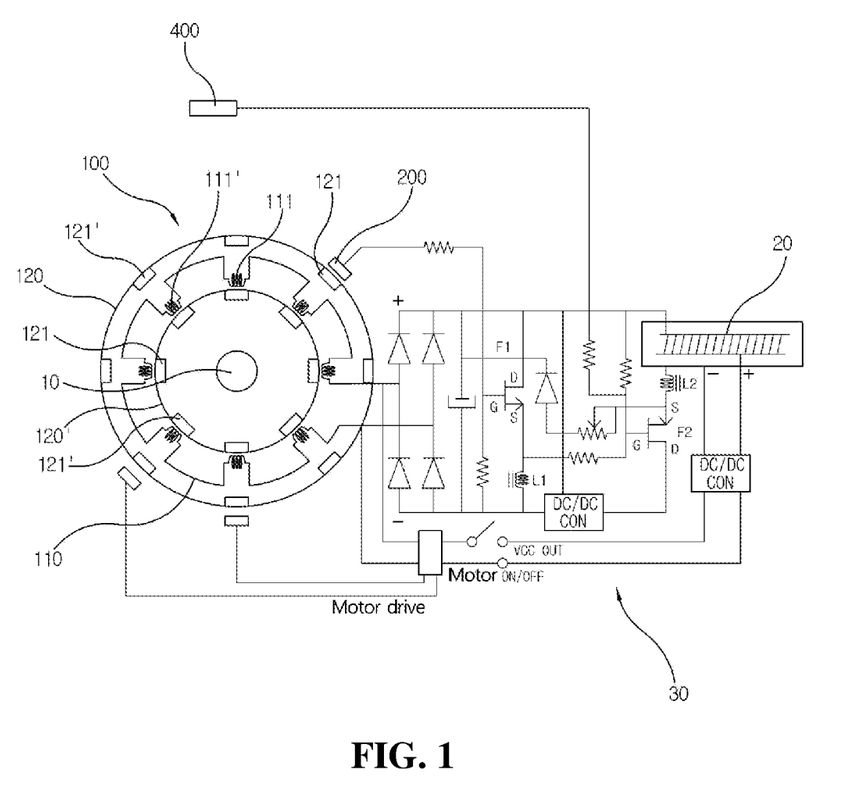
FIG. 1 is an overall schematic view of a disc brake apparatus including combined generation and electric operation means according to the present invention.
Figure 2:
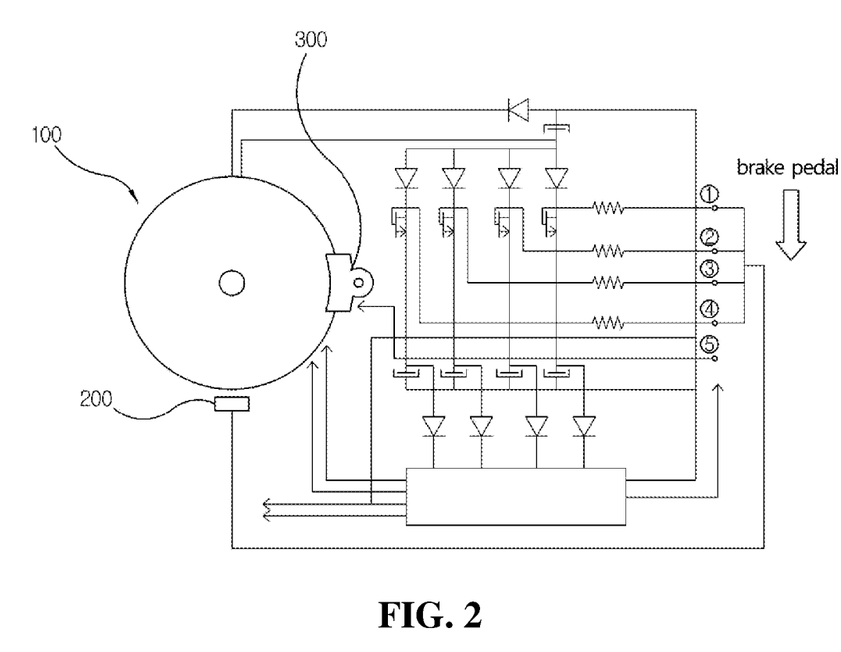
FIG. 2 is a view illustrating a substantial part of a braking structure of the disc brake apparatus including the combined generation and electric operation means according to the present invention.
Figure 3:
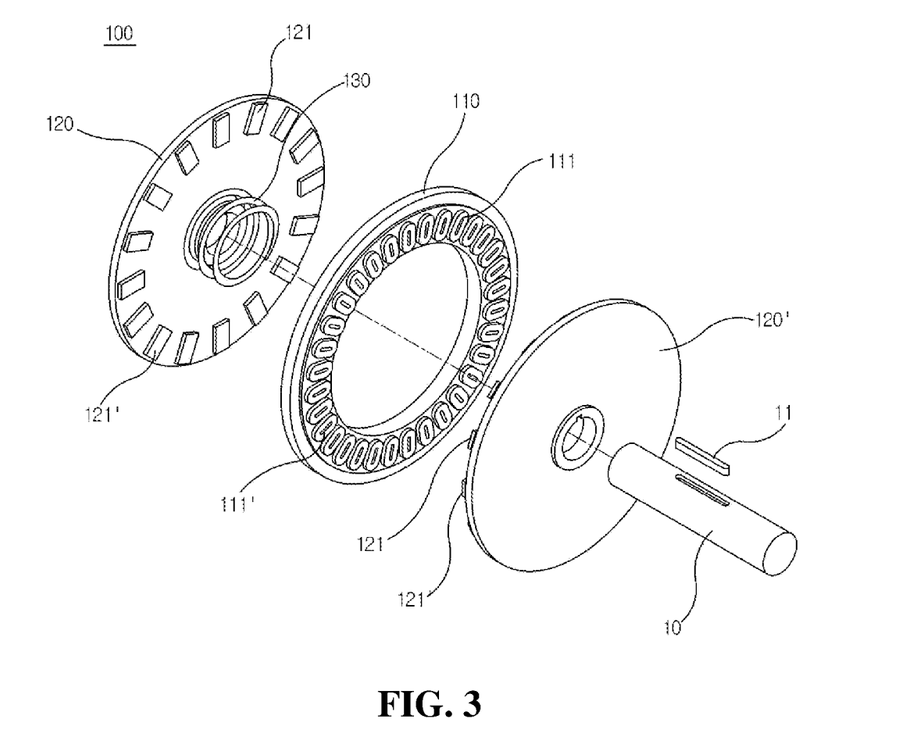
FIG. 3 is an exploded perspective view of a disc unit of the disc brake apparatus including the combined generation and electric operation means according to the present invention.
Figure 4:
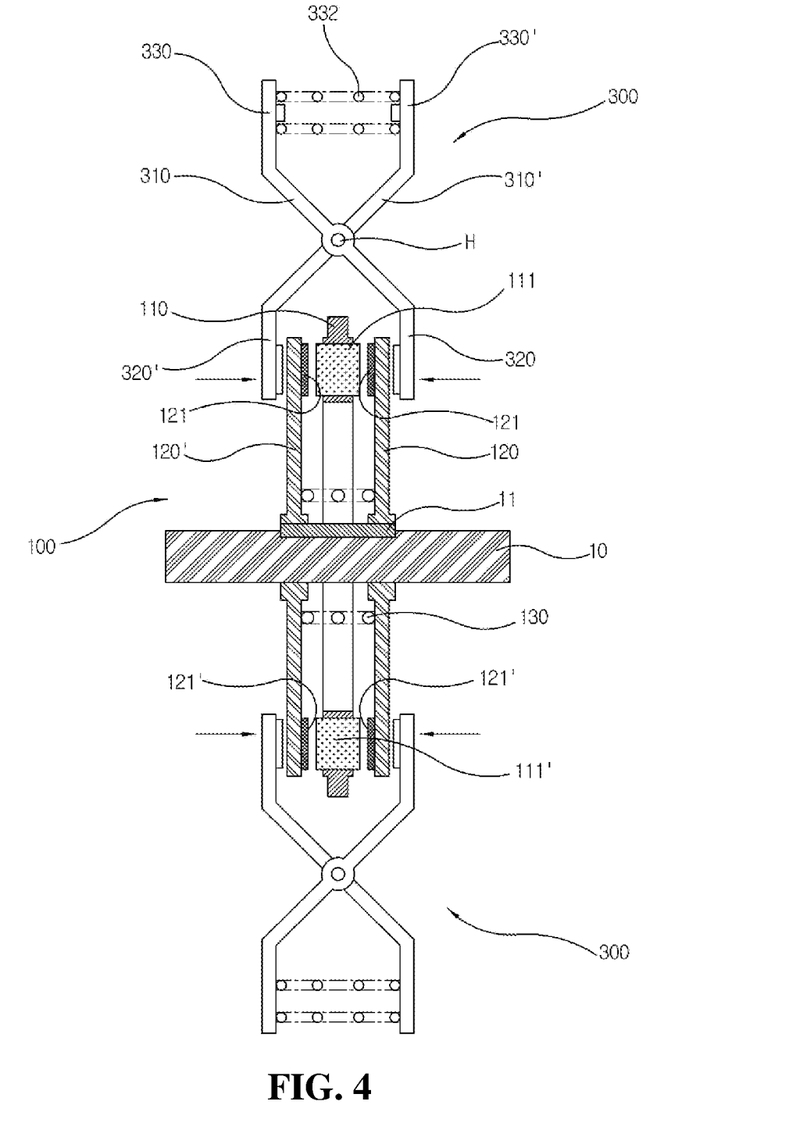
FIG. 4 is an assembled cross-sectional view illustrating the disc unit and a braking unit of the disc brake apparatus including the combined generation and electric operation means according to the present invention.

FIG. 1 is an overall schematic view of a disc brake apparatus including combined generation and electric operation means according to the present invention. FIG. 2 is a view illustrating a substantial part of a braking structure of the disc brake apparatus including the combined generation and electric operation means according to the present invention. FIG. 3 is an exploded perspective view of a disc unit of the disc brake apparatus including the combined generation and electric operation means according to the present invention. FIG. 4 is an assembled cross-sectional view illustrating a disc unit and a braking unit of the disc brake apparatus including the combined generation and electric operation means according to the present invention.

As illustrated in FIGS. 1 to 4, the disc brake apparatus including the combined generation and electric operation means according to the present invention includes a disc unit 100, a Hall sensor 200, and a braking unit 300.

First, the disc unit 100, which is included in the disc brake apparatus including the combined generation and electric operation means according to the present invention so as to perform electric generation and provision of driving force, includes a stationary plate 110 and rotating plates 120 and 120'.

Here, the stationary plate 110 is configured to have the form of an annular plate, and is made of a nonmagnetic material. The stationary plate 110 has a central bore, through which a rotating drive shaft 10 of a wheel extends without interference therebetween, and is fixedly mounted to a vehicle body (not shown).

The stationary plate 110 is provided with a plurality of coil elements 111 and 111', which are radially arranged about the center of the stationary plate 110.

According to the present invention, the plurality of coil elements 111 and 111' are embodied as a plurality of non-core coil elements, and are disposed through the stationary plate 110 so as to be equally exposed at both lateral sides thereof. The coil elements 111 and 111' are connected to each other in series.

The rotating plates 120 and 120' are composed of a pair of rotating plates, which have annular shapes corresponding to each other, and are disposed on both lateral sides of the stationary plate 110. The rotating plates 120 and 120' are made of a nonmagnetic material, and are fixed to the drive shaft 10 in the state of being spaced apart from the two lateral sides of the stationary plate 110.

Preferably, the rotating plates 120 and 120' are slidably coupled to the drive shaft 10 via a key 11 so as to be slidable toward the stationary plate 110.

Each of the rotating plates 120 and 120' is provided with a plurality of magnets 121 and 121', which are radially disposed along the periphery of one side surface of the rotating plate that faces the stationary plate 110 so as to correspond to respective coil elements 111 and 111' of the stationary plate 110.

The rotating plates 120 and 120' are preferably spaced apart from the stationary plate 110 such that the coil elements 111 and 111' are positioned within the ranges of magnetic force of the magnets 121 and 121'.

According to the present invention, a compression spring 130 is connected to the side surface of each of the rotating plates 120 and 120' so as to surround the drive shaft 10. The compression springs 130 are configured to provide restoring force when the rotating plates 120 and 120' are pushed toward the stationary plate 110 during a braking procedure, which will be described later.

Specifically, the disc unit 100 is constructed such that electric charges having a polarity are applied to the coil elements 111 and 111' from the magnets 121 and 121' while rotating plates 120 and 120' are rotated and thus electric power is generated by the coil elements 111 and 111' by virtue of the polarity of the applied electric charges and is stored in a battery 20.

The battery 20, which is applied to the present invention, may be a typical battery mounted to a vehicle body or an additional energy storage system (ESS).

Meanwhile, the disc unit 100 is constructed such that, when the electric power stored in the battery 20 is applied to the coil elements 111 and 111', the polarity of the electric charges, which are generated from the coil elements 111 and 111', interferes with the polarity of the magnets 121 and 121' of the rotating plates 120 and 120' to generate attractive force and repulsive force therebetween, thereby providing the rotating plates 120 and 120' with rotative force.

Furthermore, the disc unit 100 is constructed such that frictional force is generated between the disc unit 100 and the braking unit 300 so as to perform a braking action when the braking unit 300 is operated.

In the disc brake apparatus including the combined generation and electric operation means according to the present invention, the Hall sensor 200 is disposed close to the rotating plates 120 and 120' so as to detect a voltage caused by magnetic fields generated by the magnets 121 and 121'. Preferably, the Hall sensor 200 is configured so as to detect electrical energy corresponding to the distance from the magnets 121 and 121', which generate magnetic force, and to control the electrical energy based on the detected amount of electrical energy by means of a circuit 30.

Here, the Hall sensor 200 detects the voltage of the magnets 121 and 121' when a brake pedal (not shown) of the vehicle body is actuated. Preferably, with the increase in the magnitude of the pressing force of the brake pedal, the distance between the Hall sensor 200 and the magnets 121 and 121' decreases and thus the voltage increases. For example, the voltage varies within a range from a first stage to a fourth stage according to the pressing force of the brake pedal.

The structure configured to control the distance between the Hall sensor 200 and the magnets 121 and 121' by means of the brake pedal is not newly devised. The Hall sensor 200 may be directly connected to a general brake pedal so as to be directly operated by actuation of the brake pedal, or the Hall sensor 200 may be provided at friction portions 320 and 320' such that the distance between the Hall sensor 200 and the magnets 121 and 121' is controlled by actuation of the friction portions 320 and 320'.

Specifically, the Hall sensor 200 interacts with the magnets 121 and 121' of the rotating plates 120 and 120' and detects the voltage therebetween when the brake pedal is actuated. Subsequently, according to the detected electrical energy, the current from the battery 20 is applied to the coil elements 111 and 111' of the stationary plate 110 through the circuit 30 so as to electromagnetize the coil elements 111 and 111'. Consequently, the coil elements 111 and 111' have a polarity different from the polarity of the magnets 121 and 121' of the rotating plates 120 and 120', thereby electrically braking the rotating plates 120 and 120' by virtue of the attractive force between the coil elements 111 and 111' and the magnets 121 and 121'.

In the disc brake apparatus including the combined generation and electric operation means according to the present invention, the braking unit 300 is configured to provide frictional force to the rotating plates 120 and 120' of the disc unit 100 to thus perform a braking action. The braking unit 300 is configured to be operated when the brake pedal is actuated beyond the acceptable output range of the Hall sensor 200, and is composed of a pair of braking units.

To this end, referring to FIG. 4 each of the braking units 300 is composed of a pair of press members 310 and 310', which are coupled to each other at the centers thereof via a hinge H so as to have an "X" shape, thereby providing opposite rotative forces.

Each of the press members 310 and 310' is provided at one end thereof with a friction portion 320 or 320', which projects from the press member and comes into contact with the outer surface of the rotating plate 120 or 120' so as to provide frictional force to the rotating plate 120 or 120'. A brake pad (not shown) is mounted to each of the friction portions 320 and 320'.

Each of the press members 310 and 310' is provided at the other end thereof with a press portion 330 or 330', which is connected to the brake pedal so as to provide rotative force to the press member 310 or 310'.

Here, the pair of press members 330 and 330' are connected to each other via a restoring spring 332, which biases the pair of press members 330 and 330' outwards such that the pair of press members 330 and 330' are automatically restored to the normal position thereof upon releasing actuation of the brake pedal.

In other words, the braking unit 300 is configured to press the two rotating plates 120 and 120' using the pressing force of the press members 310 and 310' to thus generate frictional force therebetween for mechanical braking action when the brake pedal is actuated.

The disc brake apparatus according to the present invention may further include a gyro sensor 400.

Here, the gyro sensor 400 measures a slope angle of an uphill road, and the electric power stored in the battery 20 is applied to the coil elements 111 and 111' according to the measured slope angle. Consequently, the polarity of the electric charges generated by the coil elements 111 and 111' interferes with the polarity of the magnets 121 and 121' to generate attractive force and repulsive force therebetween, thereby providing rotative force to the rotating plates 120 and 120'.

In the disc brake apparatus according to the present invention, it goes without saying that the coil elements 111 and 111', the battery 20, the Hall sensor 200, the gyro sensor 400, and the brake pedal are connected to one another via the separate circuit 30 so as to be organically operated. Here, the circuit 30 is not limited to the construction shown in the drawings, and may be modified into any of various constructions.

Hereinafter, the operation of the disc brake apparatus including the combined generation and electric operation means according to the present invention will be described in detail with reference to the accompanying drawings.

Because the disc brake apparatus including the combined generation and electric operation means according to the present invention is configured to consecutively perform both electric braking and mechanical braking of a transportation vehicle such as an automobile or a motorcycle having an electric operation structure, it is possible to minimize the generation of fine metal particles during mechanical braking.

With regard to the braking operation, electric braking will first be described with reference to FIGS. 1 to 4.

Figure 5:
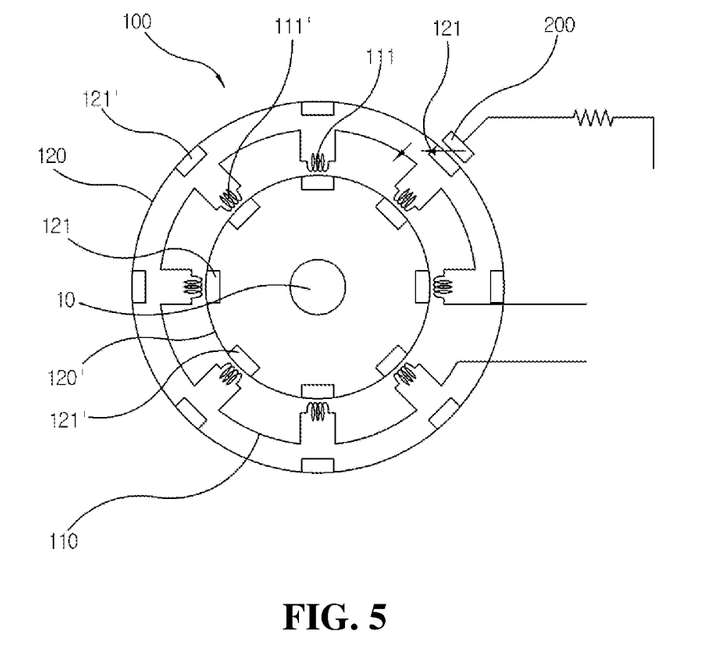
FIG. 5 is a view illustrating electromagnetic braking of the disc brake apparatus including the combined generation and electric operation means according to the present invention.

Referring to FIG. 5, when the brake pedal is pressed by a driver, the Hall sensor 200 is brought close to the rotating plates 120 and 120' and the magnets 121 and 121' and thus detects the voltage by the magnetic fields. Referring to the circuit 30 shown in FIG. 1, the detected voltage varies depending on the distance between the Hall sensor 200 and the magnets 121 and 121', and the output voltage charges the battery 20 through F1 (electric switching device (FET))/G circuit by electromagnetically shorting D and S of F2. After completion of charging of the battery 20, the excess voltage is supplied to the G of the F1 so as to cause the voltage to flow to the S from the D. Here, when the braking unit 300 is operated, a load is applied due to appropriate resistance value of L1, and thus the coil elements 111 and 111' of the stationary plate 110 become electromagnets. At this point, because the magnets 121 and 121' of the rotating plates 120 and 120' have magnetic polarities different from each other, attractive force is applied between the rotating plates 120 and 120', thereby realizing non-contact electric-electromagnetic braking.

For example, when current of N polarity flows through the coil elements 111 and 111' in the case in which the magnets 121 and 121' of the rotating plates 120 and 120' have S polarity, attractive force is generated between the magnets 121 and 121' and the coil elements 111 and 111' due to the different polarities thereof, thereby performing braking of the rotating plates 120 and 120'.

Here, because the voltage detected by the Hall sensor 200 increases with the increase in the extent to which the brake pedal is pressed, the braking force is controlled based on the extent to which the brake pedal is depressed. The braking force may be classified into four stages depending on the extent to which the brake pedal is depressed.

Furthermore, the disc brake apparatus including the combined generation and electric operation means according to the present invention is capable of continuously performing mechanical braking using the braking unit 300.

Accordingly, when the speed of the vehicle is considerably lowered to the first stage from the fourth stage by the operation of the Hall sensor 200 caused by the brake pedal, the final braking is mechanically performed by the braking unit 300.

Figure 6:
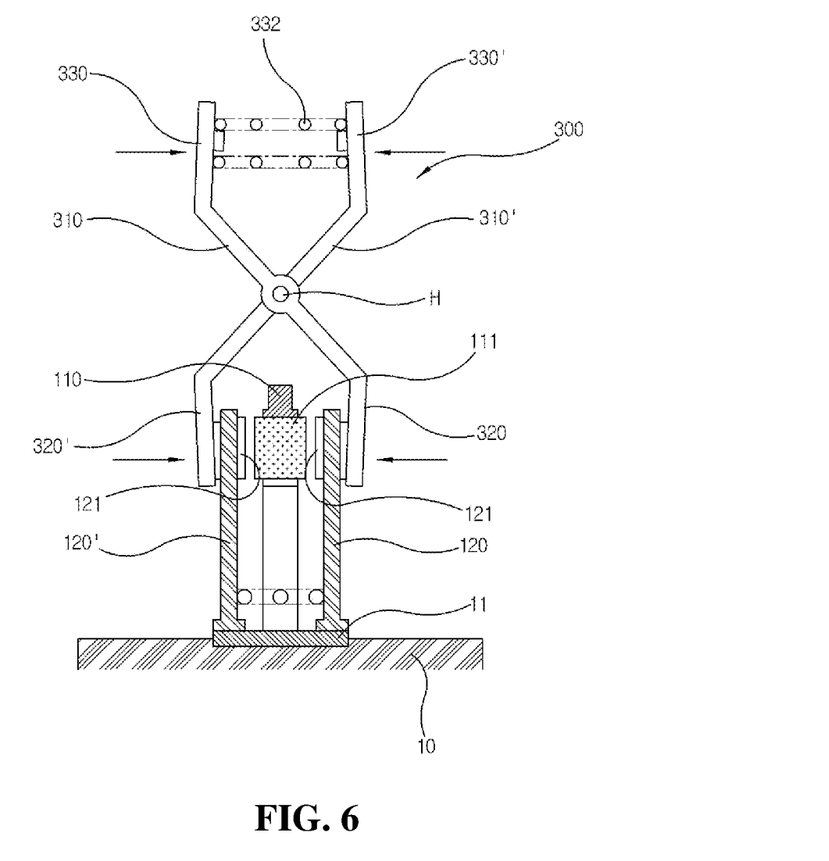
FIG. 6 is a view illustrating mechanical braking of the disc brake apparatus including the combined generation and electric operation means according to the present invention.

Specifically, when the brake pedal is pressed, the press portions 330 and 330' of the press members 310 and 310' are pressed, as illustrated in FIG. 6. At this point, the press members 310 and 310' are rotated toward each other about the hinge H, and thus the friction portions 320 and 320' press the outer surfaces of the rotating plates 120 and 120', thereby performing mechanical braking by virtue of the frictional force between the friction portions 320 and 320' and the rotating plates 120 and 120'.

In other words, in the case in which the braking procedure is classified into, for example, five stages, the braking from the first stage to the fourth stage, which corresponds to 80% of the overall braking procedure, is electromagnetically performed using the attractive force between the coil elements 111 and 111' and the magnets 121 and 121' by detection of the Hall sensor 200, and the braking of the fifth stage, which corresponds to the remaining 20% of the overall braking procedure, is mechanically performed by the braking unit 300. Accordingly, because the proportion of the entire braking procedure that is achieved by mechanical braking is minimized, it is possible to reduce metallic wear to thus minimize splashing of fine metal particles.

Meanwhile, the disc brake apparatus including the combined generation and electric operation means according to the present invention is constructed such that, when the rotating plates 120 and 120' are rotated together with the drive shaft 10 in the normal driving state, charges are applied to the coil elements 111 and 111' of the stationary plate 110 from the magnets 121 and 121', and electric power is generated in the coil elements 111 and 111' by the applied charges and is then stored in the battery 20.

Furthermore, in the case in which the disc brake apparatus including the combined generation and electric operation means according to the present invention further includes the gyro sensor 400, when the vehicle drives on an uphill road, the gyro sensor 400 detects the slope angle of the uphill road to thereby allow the electric power stored in the battery 20 to be applied to the coil elements 111 and 111'. At this point, the polarity of the charges generated by the coil elements 111 and 111' interferes with the polarity of the magnets 121 and 121' of the rotating plates 120 and 120', whereby an attractive force and a repulsive force are generated between the coil elements 111 and 111' and the magnets 121 and 121' so as to provide rotative force to the rotating plates 120 and 120', thereby additionally supporting the driving force of the engine.

As is apparent from the above description, since the disc brake apparatus including the combined generation and electric operation means according to the present invention minimizes the proportion of the entire braking procedure that is accomplished through mechanical braking, it is possible to minimize generation of fine metal particles such as particles of brake pads and thus to prevent environmental contamination caused by the fine metal particles.

The invention claimed is:

1. A disc brake apparatus comprising:
a disc unit including a stationary plate WHOM, which is made of a nonmagnetic material and includes a plurality of coil elements, which are radially arranged about a center of the stationary plate WHOM so as to be exposed from two lateral sides of the stationary plate, the stationary plate being fixed to a vehicle body and being disposed around a drive shaft so as to prevent a rotational interference with the drive shaft, and a pair of rotating plates, which are made of a nonmagnetic material and are coupled to the drive shaft via a key so as to be rotated together with the drive shaft at the two lateral sides of the stationary plate, the pair of rotating plates being provided on surfaces thereof that face the stationary plate with a plurality of magnets, which are radially arranged, and being elastically supported by respective compression springs, wherein electrical power is generated by charges applied to the coil elements and stored in a battery;

a Hall sensor, which is disposed adjacent to the pair of rotating plates so as to detect a voltage caused by magnetic fields generated by the magnets due to actuation of a brake pedal, the Hall sensor allowing current stored in the battery to be applied to the coil elements so as to electromagnetize the coil elements such that a polarity of the coil elements and a polarity of the magnets of the pair of rotating plates interact with each other to provide braking force caused by attractive force between the pair of rotating plates depending on the detected voltage; and a braking assembly, which is disposed so as to surround peripheries of the pair of rotating plates at two outer lateral sides of the pair of rotating plates, the braking assembly being configured to press the pair of rotating plates to thus provide braking force caused by frictional force therebetween to the pair of rotating plates when the brake pedal is actuated beyond an acceptable output range of the Hall sensor, wherein the Hall sensor is configured such that a distance between the Hall sensor and the magnets decreases to thereby increase a voltage detected by the Hall sensor with increase of pressing force of the brake pedal.

2. The disc brake apparatus according to claim 1, wherein the braking assembly includes a pair of press members, which are rotatably coupled to each other via a hinge so as to have an "X" shape, wherein each of the pair of press members is provided at one end thereof with a friction portion including a brake pad, which comes into contact with a respective one of the pair of rotating plates so as to provide frictional force, and is provided at a remaining end thereof with a press portion, which is connected to the brake pedal so as to provide rotative force to a respective one of the pair of press members, and wherein each of the press portions are connected to each other via a restoring spring.

3. The disc brake apparatus according to claim 1, further comprising a gyro sensor, which is configured to measure a slope angle of an uphill road and, depending on the measured slope angle, to allow the electric power stored in the battery to be applied to the coil elements to thus provide power to the drive shaft.

* * * * *